United States Patent
Reinardt et al.

(10) Patent No.: US 9,050,859 B2
(45) Date of Patent: Jun. 9, 2015

(54) TREAD MADE FROM MULTI CAP COMPOUNDS

(71) Applicant: The Goodyear Tire & Rubber Company, Akron, OH (US)

(72) Inventors: Ralf Reinardt, Perl-Besch (DE); Thomas Gesenhoff, Trier (DE); Michel Jean Yves Windeshausen, Messancy (BE); Malik Djelloul-Mazouz, Bereldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 143 days.

(21) Appl. No.: 13/767,348

(22) Filed: Feb. 14, 2013

(65) Prior Publication Data

US 2014/0041776 A1    Feb. 13, 2014

Related U.S. Application Data

(60) Provisional application No. 61/680,304, filed on Aug. 7, 2012.

(51) Int. Cl.
 *B60C 1/00* (2006.01)
 *B60C 11/04* (2006.01)
 (Continued)

(52) U.S. Cl.
 CPC ............ *B60C 11/0041* (2013.04); *B60C 1/0016* (2013.04); *B60C 11/005* (2013.01); *B60C 11/0309* (2013.04); *B60C 2011/0025* (2013.04)

(58) Field of Classification Search
 CPC ........ B60C 11/00; B60C 1/00; B60C 11/005; B60C 11/0041; B60C 11/0075; B60C 11/0058; B60C 11/0066; B60C 1/0016; B60C 2011/0016; B60C 2011/0025; B60C 2011/0033; B60C 2011/0386; B60C 2011/0388; B60C 2011/039; B60C 11/04
 USPC .................. 152/209.5, 209.6, 209.1, 209.18, 152/209.28, 900, 901
 See application file for complete search history.

(56) References Cited

U.S. PATENT DOCUMENTS 1,664,352 A    3/1928    Coleman
3,853,164 A    12/1974    Mirtain
(Continued)

FOREIGN PATENT DOCUMENTS

EP    2108527 A1    10/2009
EP    2163403 A2    3/2010
(Continued)

OTHER PUBLICATIONS

EPO Search Report dated Nov. 5, 2013.

*Primary Examiner* — Eric Hug
(74) *Attorney, Agent, or Firm* — June E Rickey

(57) ABSTRACT

A pneumatic tire having a tire tread is disclosed, wherein the tread comprises one or more tread elements and one or more grooves, the tread having a radially outer surface and a non-skid tread depth as measured from the radially outer surface of the tread and a radially innermost surface of the grooves. The tread has a radially innermost layer comprised of a base tread compound, a radially outer tread cap layer and a middle tread cap layer located between the base layer and the outer tread cap layer. Wherein the radially outer tread cap layer has a defined depth D, except that there is at least one notched areas wherein the tread cap layer extends radially inward of the defined depth D.

10 Claims, 1 Drawing Sheet

(51) Int. Cl.
*B60C 11/00* (2006.01)
*B60C 11/03* (2006.01)

(56) References Cited

U.S. PATENT DOCUMENTS

| | | | |
|---|---|---|---|
| 4,478,266 A * | 10/1984 | Pierson et al. | 152/209.5 |
| 4,698,245 A | 10/1987 | Schallmeier et al. | |
| 5,997,673 A * | 12/1999 | Sandstrom et al. | 156/110.1 |
| 6,247,512 B1 | 6/2001 | Radulescu | |
| 6,412,532 B1 | 7/2002 | Iida et al. | |
| 6,820,666 B2 * | 11/2004 | Nahmias Nanni et al. | 152/209.4 |
| 6,991,014 B2 | 1/2006 | Suzuki | |
| 7,188,651 B2 * | 3/2007 | Suzuki | 152/209.5 |
| 2007/0017617 A1 * | 1/2007 | Lafrique et al. | 152/209.5 |
| 2009/0071584 A1 | 3/2009 | Zhang et al. | |
| 2009/0255613 A1 * | 10/2009 | Zhang et al. | 152/209.5 |
| 2010/0059156 A1 * | 3/2010 | Cambron et al. | 152/209.5 |
| 2010/0230021 A1 * | 9/2010 | Merino Lopez et al. | 152/209.7 |

FOREIGN PATENT DOCUMENTS

| | | |
|---|---|---|
| GB | 2058687 A | 4/1981 |
| JP | 2002-019418 | 1/2002 |
| JP | 2003104009 A | 4/2003 |
| WO | 2013066310 | 5/2013 |

* cited by examiner

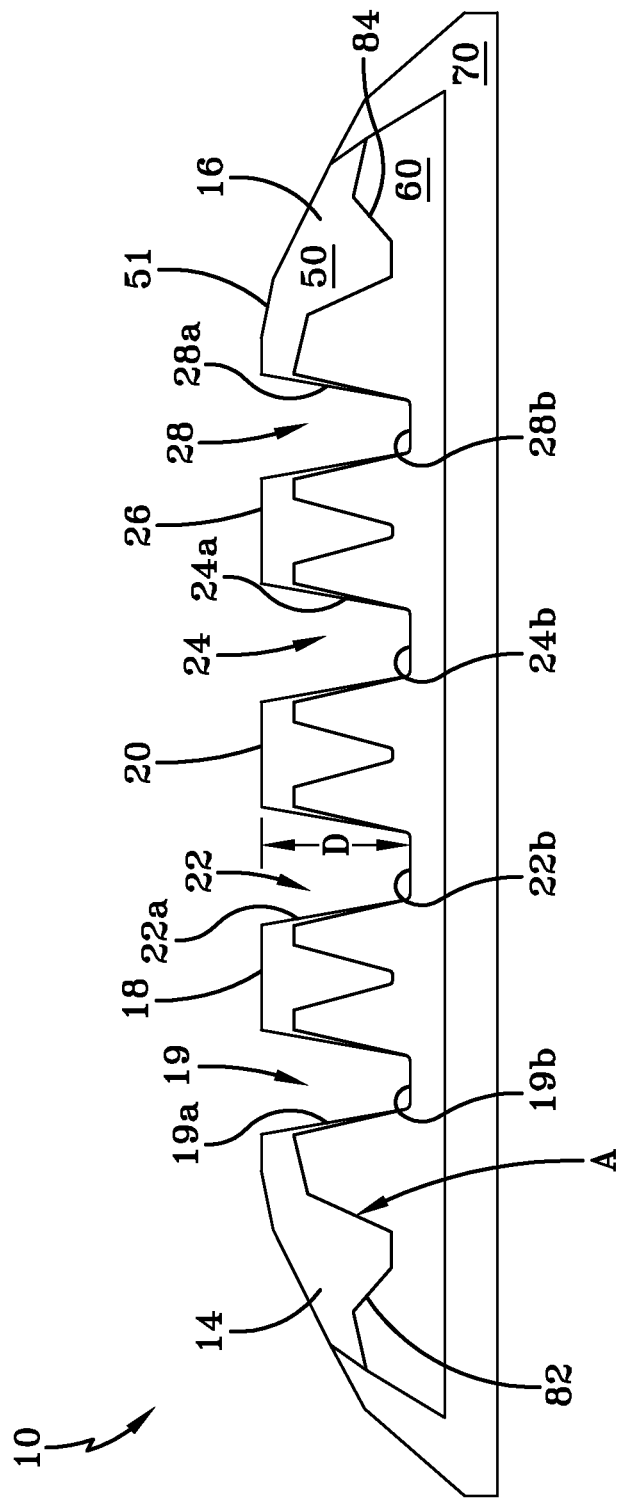

TREAD MADE FROM MULTI CAP COMPOUNDS

FIELD OF THE INVENTION

The present invention is directed to a pneumatic tire. More particularly, the invention is directed to an evolving tread pattern and rubber composition that change as the tire wears in order to maintain performance.

BACKGROUND OF THE INVENTION

As a tire wears, the volume of the tread decreases due to frictional contact with the road surface. As the tire wears, the volume of the grooves decrease, as the non-skid decreases. When the groove volume decreases, it reduces the tire's ability to channel water away from the tire footprint, reducing wet road tire performance. For some tread configurations, even if the tire tread has not worn down to the legal minimum non-skid depth, the tire's wet road performance may be severely limited.

It is thus desired to provide a tire having excellent wet and dry performance characteristics when new, and have acceptable wet and dry tire performance during its life.

SUMMARY OF THE INVENTION

A pneumatic tire is provided that maximizes the combined wet grip and rolling resistance performance during the life of the tire. The tire having a tire tread with at least one groove and a radially outer surface and a non-skid tread depth as measured from the radially outer surface of the tread and a radially innermost surface of the grooves. The tread has a radially innermost layer comprised of a base tread compound, a radially outer tread cap layer and a middle tread cap layer located between the base layer and the outer tread cap layer. Wherein the radially outer tread cap layer has a defined depth D, except that there is at least one notched areas wherein the tread cap layer extends radially inward of the defined depth D. The outer tread cap layer is comprised of a compound for favorable wet properties, while the middle tread cap layer is comprised of a compound for favorable rolling resistance properties.

Definitions

"Blade" means a protrusion in a tire curing mold that forms part of the tread design. The protrusion forms a corresponding depression in the finished tire tread.

"Groove" means an elongated void area in a tread that may extend circumferentially or laterally about the tread in a straight curved, or zigzag manner. Circumferentially and laterally extending grooves sometimes have common portions and may be sub classified as "wide" or "narrow." A "narrow groove" has a width greater than a sipe, but less than or equal to about 4.0 mm and a "wide groove" has a width greater than about 4.0 mm. The groove width is equal to tread surface area occupied by a groove or groove portion, divided by the length of such groove or groove portion; thus, the groove width is its average width over its length.

"Radial" and "radially" are used to mean directions radially toward or away from the axis of rotation of the tire.

"Rib" means a circumferentially extending strip of rubber of the tread which is defined by at least one circumferential groove and either a second circumferential groove or a lateral edge, wherein the strip is not divided by full depth grooves.

"Sipes" refer to very narrow width grooves molded into tread elements of a tire that subdivide the tread elements.

Sipes have a width in the range of about 0.3 mm to about 1.0 mm. The width of a sipe is such that the sipe tends to close completely in a tire footprint.

BRIEF DESCRIPTION OF THE DRAWINGS

The invention will be described by way of example and with reference to the accompanying drawings in which:

FIG. 1 is a cross-sectional view of a first embodiment of tread layout for a tire of the present invention;

DETAILED DESCRIPTION OF THE INVENTION

A cross-sectional view of a cured pneumatic tire tread layout 10 is shown in FIG. 1. The pneumatic tire may be formed of typical tire components known to those skilled in the art, such as, but not limited to, inner liner (not shown), annular beads (not shown), sidewall (not shown), apex (not shown), plies (not shown), and belt package (not shown). The tire tread 10 has a first and second shoulder block 14, 16 forming the shoulder region of the tire. The tire tread 10 may further comprise at least two ribs 18, 20, preferably three ribs 18, 20, 26. The invention is not limited to ribs, and may alternatively be tread blocks, preferably circumferentially aligned tread blocks. Ribs 18, 26 are separated from shoulder blocks 14, 16 with grooves 19, 28 respectively. Ribs 18, 20, 26 are separated from each other with grooves 22, 24. The grooves 19, 22, 24, 28 have a defined depth D and preferably have inclined opposed sidewalls 19a, 22a, 24a, 28a and a flat bottom 19b, 22b, 24b, and 28b.

In a second embodiment of the invention, the tire tread may comprise a plurality of grooves, particularly v shaped grooves, wherein the tread has no shoulder blocks, ribs, or tread blocks. The v shaped grooves extend from one edge of the tread to the other edge of the tread. Each groove has a defined depth D.

The above described tread patterns are merely exemplary, as the invention is not limited to the above described tire tread patterns, as other patterns would work for the invention.

The tire tread layout 10 is comprised of three layers of different rubber compositions 50, 60 and 70. The radially outer tread cap layer 50 (or Cap 1) is formed of a rubber composition selected for good traction properties, as described in more detail, below. The tire tread further comprises a middle tread cap layer 60 (or cap 2) that is selected from a rubber composition suitable for high rolling resistance properties, as described in more detail, below. The tire tread further comprises a third layer or tread base rubber layer 70 which underlies the two-layer tread cap 50, 60.

As shown in the FIG. 1, the tread profile has grooves having a non skid depth or nsk labeled as D in FIG. 1. The radially outer tread cap layer 50 is bounded by the radially outermost surface 51 of the tread and the dividing line A of FIG. 1, which separates the cap layer 50 from the cap layer 60. In the shoulder blocks 14, 16, the dividing line A forms notched portions 82, 84, so that the radially outer tread cap layer 50 extends radially inward to a depth in the range of about 50% to 110%, typically about 80-90% of the non skid depth D. In at least one of the tire rib or blocks the dividing line between the middle cap layer 60 and the outer tread cap layer 50, the dividing line is v shaped such that the outer tread cap compound extends radially inward at a depth of about 80% to 110% of the groove depth D. Preferably two or more ribs/blocks have a v shaped diving line, and being located on each side of the tread. The V shaped dividing line provides for extended wet grip contact as the tire wears, while allowing maximum volume of rolling resistance compound in the middle cap layer.

A tire's ability to stop on wet surfaces, also known as wet performance or wet grip, is largely driven by the contact area of the tire tread with the road. Selection of a compound for the outer tread cap rubber layer 50 may improve wet traction properties, particularly if the compound has a rebound at 23 C in the range of 14-28, more particularly 18-24. Thus as the tire tread wears, the notched portions 82, 84 allow the tread cap compound 50 to stay in contact with the road.

The tire of the present invention has the compound for the inner tread cap rubber layer 60 selected for low rolling resistance properties. The rolling resistance is largely determined by the volume of the rubber layer compound 60. The compound selected for optimal rolling resistance should have a tread rebound at 100 C of 56-90, and more particularly 62-74. In one example for a summer tire, the tread caps may have the properties as described in the Table below. The tread caps may be co-extruded. Exemplary tread compounds may be found in U.S. Pat. No. 7,441,572 and Us patent application no. 2010-0144946, which are incorporated by reference herein.

|  | Tread cap layer 50 range (wet) | Tread cap layer 60 range (RR) |
| --- | --- | --- |
| Shore hardness | 60-75 | 55-70 |
| RPA G' at 1% strain, 100 C., 1 Hz | 2.5-5.5 | 1.0-3.5 |
| rebound at 100 C. | 43-67 | 56-80 |
| Rebound at 23 C. | 14-28 | 26-46 |

In a preferred embodiment, the tread cap properties are selected in the ranges of the table below.

|  | Tread cap layer 50 range (wet) | Tread cap layer 60 range (RR) |
| --- | --- | --- |
| Shore hardness | 63-72 | 58-67 |
| RPA G' at 1% strain, 100 C., 1 Hz | 3.3-4.7 | 1.4-2.6 |
| rebound at 100 C. | 49-61 | 62-75 |
| Rebound at 23 C. | 17-25 | 32-43 |

In a more preferred embodiment, the tread cap properties are selected in the ranges of the table below.

|  | Tread cap layer 50 range (wet) | Tread cap layer 60 range (RR) |
| --- | --- | --- |
| Shore hardness | 66-70 | 61-65 |
| RPA G' at 1% strain, 100 C., 1 Hz | 3.7-4.2 | 1.7-2.3 |
| rebound at 100 C. | 52-58 | 67-73 |
| Rebound at 23 C. | 19-23 | 36-40 |

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire having a tire tread, the tread comprising one or more grooves and at least one rib, the tread having a radially outer surface and a non-skid tread depth as measured from the radially outer surface of the tread and a radially innermost surface of the grooves, the tread having a radially innermost layer comprised of a base tread compound, the tread further comprising a radially outer tread cap layer and a middle tread layer located between the base layer and the outer tread cap layer, wherein the rib has a dividing line formed between the radially outer tread cap layer and the middle tread layer, wherein the dividing line has a notched area wherein the radially outer tread cap layer extends radially inward to a depth in the range of about 80-110% of the groove depth D, wherein the radially outer tread cap layer is formed of a rubber compound having a tread rebound at 23 C in the range of 19 to 23, and wherein the middle tread cap layer is formed of a rubber compound having a tread rebound at 23 C in the range of 26-46.

2. The tire of claim 1 wherein the rib is circumferentially oriented.

3. The tire of claim 1 wherein the rib is angled with respect to the mid circumferential plane.

4. The tire of claim 1 wherein there are at least one additional rib having a dividing line forming a notched areas wherein the radially outer tread cap layer extends radially inward to a depth in the range of about 80-110% of the groove depth D.

5. The tire of claim 1 wherein the middle tread cap layer is formed of a rubber compound having a tread rebound at 100 C in the range of 56-80.

6. The tire of claim 1 wherein the middle tread cap layer is formed of a rubber compound having a tread rebound at 100 C in the range of 62-75.

7. The tire of claim 1 wherein the middle tread cap layer is formed of a rubber compound having a tread rebound at 100 C in the range of 67-73.

8. The tire of claim 1 wherein the surface of the tread comprises three circumferentially continuous grooves.

9. The tire of claim 1 wherein the surface of the tread comprises at least two circumferentially continuous ribs, wherein the ribs are located adjacent a circumferentially continuous groove.

10. A pneumatic tire having a tire tread, the tread comprising one or more grooves and at least one rib, the tread having a radially outer surface and a non-skid tread depth as measured from the radially outer surface of the tread and a radially innermost surface of the grooves, the tread having a radially innermost layer comprised of a base tread compound, the tread further comprising a radially outer tread cap layer and a middle tread layer located between the base layer and the outer tread cap layer, wherein the rib has a dividing line formed between the radially outer tread cap layer and the middle tread layer, wherein the dividing line is V shaped forming a v-shaped area of the radially outer tread cap layer having a bottom which extends radially inward to a depth in the range of about 80-110% of the groove depth D, wherein the radially outer tread cap layer is formed of a rubber compound having a tread rebound at 23 C in the range of 19 to 23, and wherein the middle tread cap layer is formed of a rubber compound having a tread rebound at 23 C in the range of 26-46.

* * * * *